(12) United States Patent
Park

(10) Patent No.: US 12,104,660 B2
(45) Date of Patent: Oct. 1, 2024

(54) SERIES ELASTIC ACTUATOR

(71) Applicant: LG ELECTRONICS INC., Seoul (KR)

(72) Inventor: Huichang Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/130,682

(22) Filed: Apr. 4, 2023

(65) Prior Publication Data

US 2023/0250852 A1    Aug. 10, 2023

Related U.S. Application Data

(63) Continuation of application No. 16/877,763, filed on May 19, 2020, now Pat. No. 11,639,739.

(30) Foreign Application Priority Data

Dec. 26, 2019    (KR) ........................ 10-2019-0175416

(51) Int. Cl.
*F16D 3/12* (2006.01)
*F16D 3/68* (2006.01)
(52) U.S. Cl.
CPC ................. *F16D 3/12* (2013.01); *F16D 3/68* (2013.01); *F16D 2200/0034* (2013.01); *F16D 2300/18* (2013.01); *Y10S 901/28* (2013.01); *Y10T 74/19633* (2015.01)
(58) Field of Classification Search
CPC ...... F16D 3/12; F16D 3/68; F16D 2200/0034; F16D 2300/18; Y10S 901/28; Y10T 74/19633

USPC ...................................................... 464/23, 76
See application file for complete search history.

(56) References Cited

U.S. PATENT DOCUMENTS

| 1,308,160 | A  | 7/1919 | Brinton |
| 2,372,625 | A  | 3/1945 | Denton |
| 3,252,696 | A  | 5/1966 | Friedel |
| 3,897,859 | A  | 8/1975 | Norcia |
| 6,169,346 | B1 | 1/2001 | Nakamura |
| 6,293,022 | B1 | 9/2001 | Chino |

(Continued)

FOREIGN PATENT DOCUMENTS

| KR | 10-2017-0037442 | 4/2017 |
| WO | WO 2017/052223  | 3/2017 |
| WO | WO 2020/259964  | 12/2020 |

OTHER PUBLICATIONS

U.S. Office Action dated Oct. 12, 2021 issued in U.S. Appl. No. 16/877,687.

(Continued)

*Primary Examiner* — Greg Binda
(74) *Attorney, Agent, or Firm* — KED & ASSOCIATES, LLP

(57) ABSTRACT

A series elastic actuator includes a gear configured to rotate, a mounting recess formed on a first surface of the gear, a plurality of elastic bodies configured to be received in the mounting recess that are made of a non-metal elastic material and spaced apart from each other in a circumferential direction, an output body configured to cover the first surface of the gear, and at least one insertion portion configured to protrude from the output body to be inserted between a pair of adjacent elastic bodies or inserted through the elastic bodies.

17 Claims, 17 Drawing Sheets

(56) References Cited

U.S. PATENT DOCUMENTS

| | | |
|---|---|---|
| 6,905,004 B2 | 6/2005 | Oppitz |
| 9,556,949 B2 | 1/2017 | Kozilek |
| 9,676,104 B2 | 6/2017 | Sutton, Jr. |
| 9,772,240 B2 | 9/2017 | Hulse |
| 10,288,124 B2 * | 5/2019 | Munk ................. F16D 3/68 |
| 2002/0169045 A1 | 11/2002 | Kodama |
| 2014/0209781 A1 | 7/2014 | Weber |
| 2015/0075311 A1 | 3/2015 | Kanzaki |
| 2020/0233448 A1 | 7/2020 | Chen |
| 2021/0033185 A1 | 2/2021 | Aguinaldo |
| 2021/0102612 A1 | 4/2021 | Cornell |
| 2021/0188412 A1 | 6/2021 | Kontopoulos |
| 2021/0199159 A1 | 7/2021 | Park |
| 2021/0199522 A1 | 7/2021 | Park |
| 2021/0239188 A1 | 8/2021 | Kontopoulos |

OTHER PUBLICATIONS

U.S. Notice of Allowance dated Jan. 28, 2022 issued in U.S. Appl. No. 16/877,687.
U.S. Office Action issued in U.S. Appl. No. 16/877,723 dated May 6, 2022.
U.S. Office Action issued in U.S. Appl. No. 16/877,723 dated Mar. 28, 2023.
U.S. Appl. No. 16/877,723, filed May 19, 2020.
U.S. Appl. No. 16/877,763, filed May 19, 2020.
U.S. Appl. No. 18/130,682, filed Apr. 4, 2023.

* cited by examiner

SERIES ELASTIC ACTUATOR

CROSS-REFERENCE TO RELATED APPLICATION(S)

This application is a Continuation Application of prior U.S. patent application Ser. No. 16/877,763 filed May 19, 2020 now U.S. Pat. No. 11,639,739, which claims priority under 35 U.S.C. § 119 to Korean Application No. 10-2019-0175416 filed on Dec. 26, 2019, whose entire disclosures are hereby incorporated by reference.

BACKGROUND

1. Field

The present disclosure relates to a series elastic actuator.

2. Background

A series elastic actuator (SEA) is generally a driver in which a predetermined elastic body is connected in series to a drive shaft of a power source such as a motor. The coupled elastic body allows the driver to flexibly adapt to external forces. By measuring a displacement of the elastic body, a torque of the driver may be determined, and a driving rigidity may be variably controlled by using the torque to the feedback control of the driver.

Series elastic actuators generally use torsion springs or tension-compression springs for torque measurement. However, in such a series elastic actuator, a reduction gear and a spring may be provided separately, and additional space and a certain configuration and arrangement of the spring may be required. In addition, rigidity of the spring may be difficult to adjust when the series elastic actuator is manufactured to be a predetermined size or less.

KR 10-2017-0037442A (Published Apr. 4, 2017, discloses an arc-shaped compression spring module for a series elastic actuator.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

<Robot>

Figure 1:
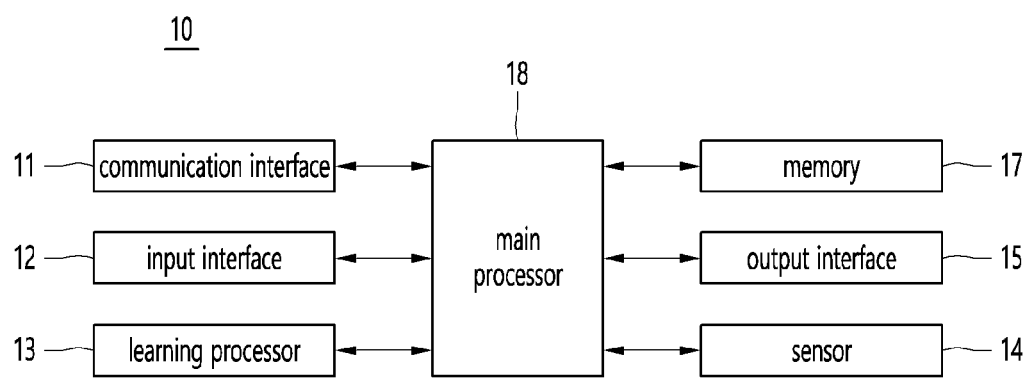
FIG. 1 is a block diagram of an artificial intelligence (AI) device for a robot according to an embodiment.

A robot may be a machine that automatically processes or operates a given task by the robot's own ability. A robot capable of recognizing an environment and performing a self-determination operation may be referred to as an intelligent robot. Robots may be classified into industrial robots, medical robots, home robots, military robots, and other types according to the robot's use, purpose, or field.

A robot may include a driving assembly, which may include an actuator or a motor to perform various physical operations such as moving a robot joint. A driving assembly in a movable robot may include a wheel, a brake, a propeller, etc. to travel on a floor or ground surface or to fly in the air.

<Artificial Intelligence (AI)>

Artificial intelligence refers to the field of studying artificial intelligence or methodology for making artificial intelligence. Machine learning refers to the field of defining various issues dealt with in the field of artificial intelligence and studying methodology for solving the various issues. Machine learning is an algorithm that enhances the performance of a certain task through a steady or prolonged experience with the certain task.

An artificial neural network (ANN) is a model used in machine learning of problem-solving ability which is composed of artificial neurons (nodes) that form a network by synaptic connections. The ANN may be defined by a connection pattern between neurons in different layers, a learning process to update model parameters, and an activation function to generate an output value.

The ANN may include an input layer, an output layer, and optionally one or more hidden layers. Each layer includes one or more neurons, and the ANN may include a synapse that links neurons to neurons. In the ANN, each neuron may output a function value of an activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the ANN may be to determine the model parameters that minimize a loss function. The loss function may be used as an index to determine optimal model parameters in the learning process of the ANN.

Machine learning may be classified into supervised learning, unsupervised learning, and reinforcement learning according to a learning method. Supervised learning may refer to a method of learning an ANN in a state where a label for learning data is given, and the label may mean the correct answer (or result value) that the ANN must infer when the learning data is input to the ANN. Unsupervised learning may refer to a method of learning an ANN in a state where a label for learning data is not given. Reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning. Deep learning is part of machine learning. In the following, machine learning is used to mean deep learning.

<Self-Driving>

Self-driving refers to a technique of driving for oneself. For example, a self-driving vehicle refers to a vehicle that travels without an operation of a user or with a minimum operation of a user. The self-driving vehicle may include a technology that maintains a lane while driving, a technology that automatically adjusts a speed (e.g., adaptive cruise control), a technology that automatically travels along a predetermined route, and a technology that automatically sets and travels a route when a destination is set. The self-driving vehicle may be a vehicle having only an internal combustion engine, a hybrid vehicle having an internal combustion engine and an electric motor together, or an electric vehicle having only an electric motor. The self-driving vehicle is not limited to automobiles but may also be a train, a motorcycle, etc. The self-driving vehicle may be regarded as a robot having a self-driving function.

FIG. 1 illustrates an artificial intelligence (AI) device 10, which may be, include, or be coupled to a robot according to an embodiment. The AI device 10 may be implemented by a stationary device or a mobile device, such as a TV, a projector, a mobile phone, a smartphone, a laptop, a desktop computer, a notebook, a digital broadcasting terminal, a personal digital assistant (PDA), a portable multimedia player (PMP), a navigation device, a tablet PC, a wearable device, a wearable assistive device or exoskeleton, a set-top box (STB), a DMB receiver, a radio, a washing machine, a refrigerator, a home appliance, a digital signage, a robot, a vehicle, etc.

The AI device 10 may include a communication interface 11, an input interface 12, a learning processor 13, a sensor 14, an output interface 15, a memory 17, and a main processor 18. The communication interface 11 may transmit and receive data to and from external devices such as other AI devices 10a to 10e (FIG. 3) and an AI server 20 (FIGS. 2-3) by using wire/wireless communication technology. For example, the communication interface 11 may transmit and receive sensor information, a user input, a learning model, and a control signal to and from external devices. The wire/wireless communication technology used by the communication interface 11 may include Global System for Mobile communication (GSM), Code Division Multi Access (CDMA), Long Term Evolution (LTE), 5G, Wireless LAN (WLAN), Wireless-Fidelity (Wi-Fi), Bluetooth™ Radio Frequency Identification (RFID), Infrared Data Association (IrDA), ZigBee, Near Field Communication (NFC), etc.

The input interface 12 may acquire various kinds of data. The input interface 12 may include a camera to input a video or image signal, a microphone to receive an audio signal, and a user input interface to receive information or commands from a user. The camera or the microphone may be treated as a sensor, and the signal acquired from the camera or the microphone may be referred to as sensing data or sensor information.

The input interface 12 may acquire learning data for model learning and input data to be used when an output is acquired by using a learning model. The input interface 12 may acquire raw input data. The main processor 18 or the learning processor 13 may extract an input feature by preprocessing the input data.

The learning processor 13 may learn a model composed of an artificial neural network (ANN) by using the acquired learning data. The learned artificial neural network may be referred to as a learning model. The learning model may be used to infer a result value for new input data rather than learning data, and the inferred result value may be used as a basis to determine whether to perform a certain operation.

Figure 2:
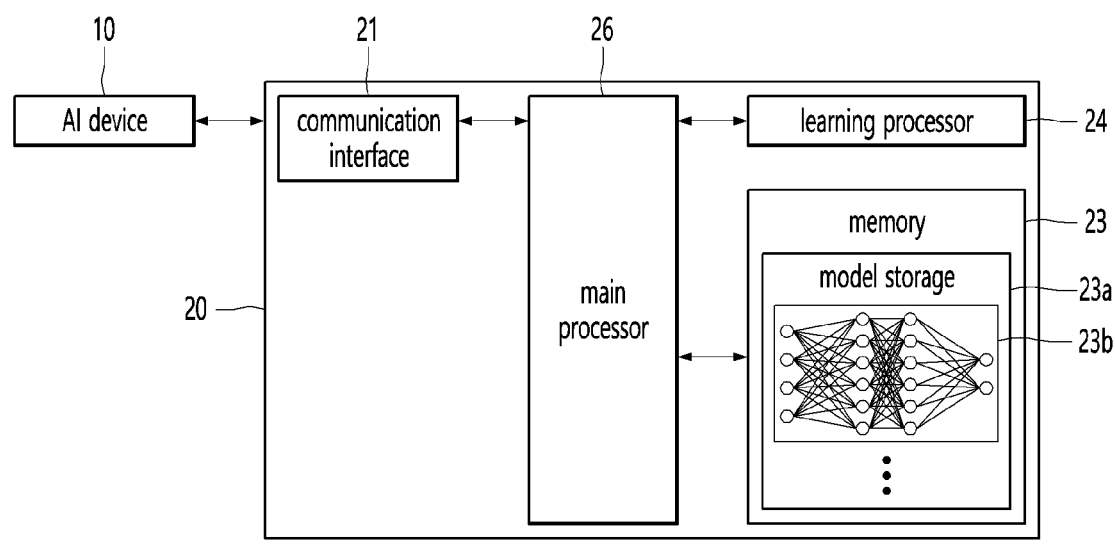
FIG. 2 is a block diagram of an AI server including the AI device of FIG. 1 and connected to a robot according to an embodiment.

The learning processor 13 may perform AI processing together with a learning processor 24 of the AI server 20 (FIG. 2). The learning processor 13 may include a learning memory integrated or implemented in the AI device 10. Alternatively, the learning processor 13 may be implemented by using a memory 17, an external memory directly connected to the AI device 10, or a memory held in an external device.

The sensor 14 may acquire at least one of internal information about the AI device 10, ambient environment information about the AI device 10, or user information by using various sensors. The sensor 14 may include at least one sensing device. For example, the sensor 14 may include a proximity sensor, an illuminance or light sensor, an acceleration sensor, a magnetic sensor or hall sensor, a gyro sensor, an inertial sensor, an RGB sensor, an IR sensor, a PIR sensor, a fingerprint recognition sensor, an ultrasonic sensor, an optical sensor, a microphone, a lidar sensor or laser sensor, and/or a radar.

The output interface 15 may generate a visual, auditory, and/or haptic output. The output interface 15 may include a display to output time information or other data, a speaker to output auditory information, and a haptic module to output haptic information.

The memory 17 may store data that supports various functions of the AI device 10. For example, the memory 17 may store input data acquired by the input interface 12, learning data, a learning model, a learning history, etc.

The main processor 18 may determine at least one executable operation of the AI device 10 based on information determined or generated by using a data analysis algorithm or a machine learning algorithm. The main processor 18 may control the other components of the AI device 10 (i.e., the input interface 12, the learning processor 13, the memory 17, the output interface 15, and the sensor 14) to execute the determined executable operation.

The main processor 18 may request, search, receive, or utilize data of the learning processor 13 or the memory 17. The main processor 18 may control the components of the AI device 10 to execute a predicted operation or an operation determined to be desirable among the at least one executable operation.

When a connection of an external device is required to perform the determined operation, the main processor 18 may generate a control signal to control the external device and may transmit the generated control signal to the external device. The main processor 18 may acquire intention information for a user input and may determine a user's requirements based on the acquired intention information. The main processor 18 may acquire intention information corresponding to the user input by using at least one of a speech to text (STT) engine to convert speech input into a text string or a natural language processing (NLP) engine to acquire intention information of a natural language.

At least one of the STT engine or the NLP engine may be configured as an artificial neural network, at least part of which is learned according to the machine learning algorithm. At least one of the STT engine or the NLP engine may be learned by the learning processor 13 of the AI device 10, the learning processor 24 of the AI server 20 (FIG. 2), or by their distributed processing.

The main processor 18 may collect history information including operation contents of an AI apparatus 100 (FIG. 4) or a user's feedback on the operation. The main processor 18 may store the collected history information in the memory 17 or the learning processor 13 or transmit the collected history information to an external device such as the AI server 20. The collected history information may be used to update the learning model.

The main processor 18 may control at least some of the components of AI device 10 so as to drive an application program stored in the memory 17. Furthermore, the main processor 18 may operate two or more of the components included in the AI device 10 in combination so as to drive an application program.

Figure 4:
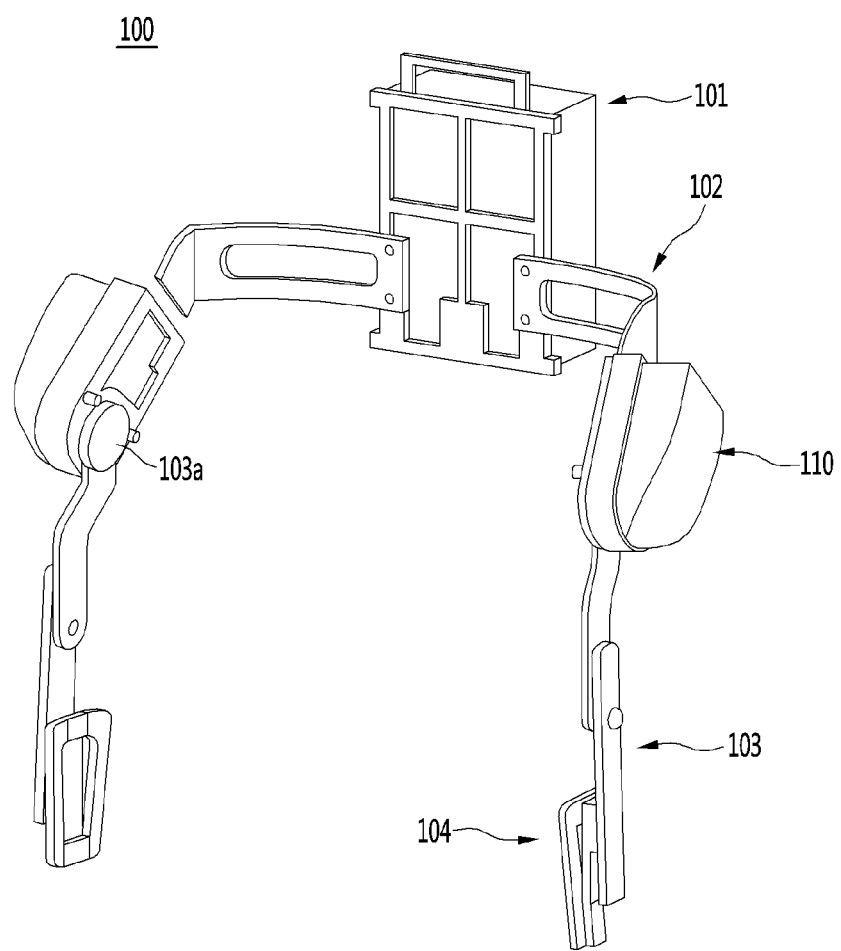
FIG. 4 is a perspective view of a robot including a series elastic actuator according to an embodiment.

Referring to FIG. 2, the AI server 20 may refer to a device that learns an artificial neural network by using a machine learning algorithm or uses a learned artificial neural network. The AI server 20 may be connected to a robot or other AI apparatus 100 (FIG. 4). The AI server 20 may include a plurality of servers to perform distributed processing, or may be defined as a 5G network. The AI server 20 may be included as a partial configuration of the AI device 10, and may perform at least part of the AI processing together with the AI device 10.

The AI server 20 may include a communication interface 21, a memory 23, a learning processor 24, and a main processor 26. The communication interface 21 may transmit and receive data to and from an external device such as the AI device 10, and may have a similar implementation as the communication interface 11 of the AI device 10 (FIG. 1).

The memory 23 may include a model storage 23*a*. The model storage 23*a* may store a learning or learned model (or an artificial neural network 23*b*) through the learning processor 24. The learning processor 24 may learn the artificial neural network 23*b* by using the learning data. The learning model may be used in a state of being mounted on the AI server 20 of the artificial neural network, or may be used in a state of being mounted on an external device such as the AI device 10.

The learning model may be implemented in hardware, software, or a combination of hardware and software. If all or part of the learning models are implemented in software, one or more instructions that constitute the learning model may be stored in the memory 23. The processor 26 may infer a result value for new input data by using the learning model and may generate a response or a control command based on the inferred result value.

Figure 3:
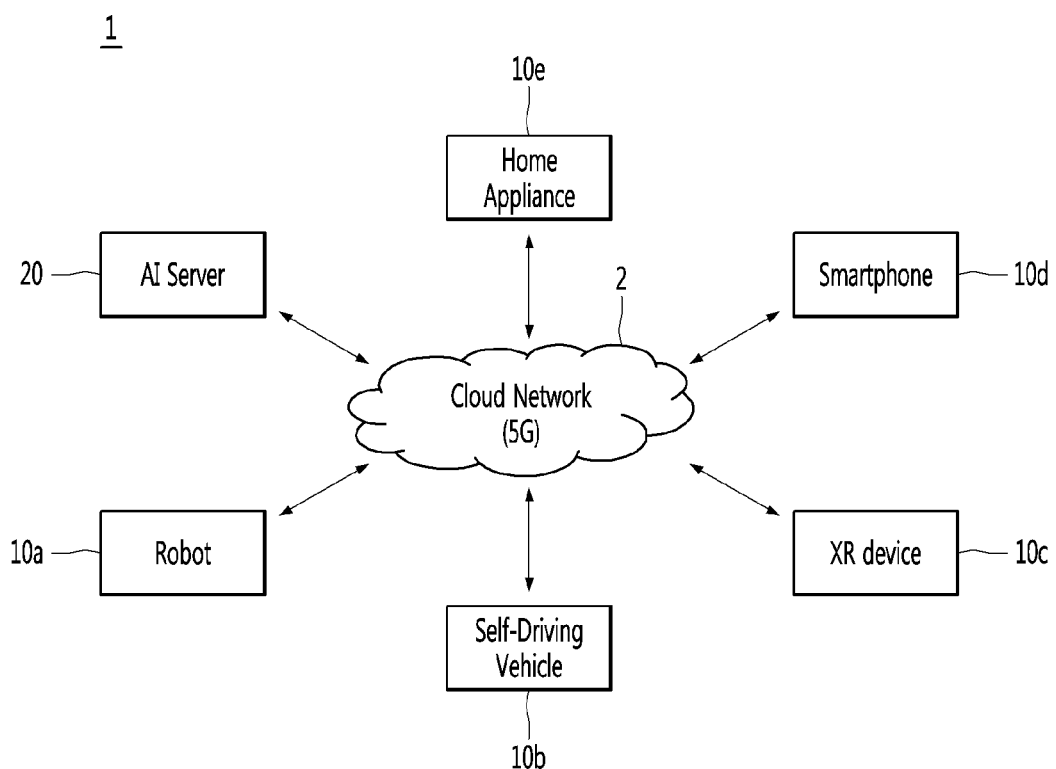
FIG. 3 illustrates an AI system including the AI server of FIG. 2 according to an embodiment.

Referring to FIG. 3, an AI system 1 may include at least one of an AI server 20, a robot 10*a*, a self-driving vehicle 10*b*, an XR device 10*c*, a smartphone 10*d*, or a home appliance 10*e* that is connected to a cloud network 2. The robot 10*a*, the self-driving vehicle 10*b*, the XR device 10*c*, the smartphone 10*d*, or the home appliance 10*e* to which AI technology is applied may be referred to as AI devices 10*a* to 10*e*.

The cloud network 2 may refer to a network that forms part of a cloud computing infrastructure or exists in a cloud computing infrastructure. The cloud network 2 may be configured by using a 3G network, a 4G or LTE network, or a 5G network.

The AI devices 10*a* to 10*e* and the AI server 20 configuring the AI system 1 may be connected to each other through the cloud network 2. Each of the AI devices 10*a* to 10*e* and 20 may communicate with each other through a base station and/or may directly communicate with each other without using a base station.

The AI server 20 may include a server that performs AI processing and a server that performs operations on big data. The AI server 20 may be connected to at least one of the AI devices 10*a* to 10*e* of the AI system 1 through the cloud network 2, and may assist at least part of AI processing of the connected AI devices 10*a* to 10*e*.

The AI server 20, instead of the AI devices 10*a* to 10*e*, may learn the artificial neural network according to the machine learning algorithm, and may directly store the learning model or transmit the learning model to the AI devices 10*a* to 10*e*. The AI server 20 may receive input data from the AI devices 10*a* to 10*e*, may infer a result value for the received input data by using the learning model, may generate a response or a control command based on the inferred result value, and may transmit the response or the control command to the AI devices 10*a* to 10*e*. Alternatively, the AI devices 10*a* to 10*e* may infer the result value for the input data by directly using the learning model, and may generate the response or the control command based on the inferred result value.

Hereinafter, various embodiments of the AI devices 10*a* to 10*e* to which the above-described technology is applied will be described. The AI devices 10*a* to 10*e* identified in FIG. 3 may be regarded as a specific embodiment of the AI device 10 of FIG. 1.

<AI+Robot>

The robot 10*a*, to which the AI technology is applied, may be implemented as a guide robot, a carrying robot, a cleaning robot, a wearable robot, an entertainment robot, a pet robot, an unmanned flying robot, etc. The robot 10*a* may include a robot control module to control an operation. The robot control module may refer to a software module or a chip implementing the software module by hardware.

The robot 10*a* may acquire state information about the robot 10*a* by using sensor information acquired from various kinds of sensors, may detect (recognize) surrounding environment and objects, may generate map data, may determine a route and a travel plan, may determine a response to user interaction, and/or may determine an operation. The robot 10*a* may use the sensor information acquired from at least one of a lidar, radar, or camera so as to determine the travel route and the travel plan.

The robot 10*a* may perform the above-described operations by using the learning model composed of at least one artificial neural network. For example, the robot 10*a* may recognize the surrounding environment and objects therein by using the learning model, and may determine an operation by using the recognized surrounding information or object information. The learning model may be learned directly from the robot 10*a* or may be learned from an external device such as the AI server 20.

The robot 10*a* may perform the determined operation by generating a result by directly using the learning model. The sensor information may be transmitted to the external device such as the AI server 20, and the generated result may be received to perform the operation. The robot 10*a* may use at least one of the map data, the object information detected from the sensor information, or the object information acquired from the external device (e.g., the AI server 20) to determine the travel route and the travel plan, and may control a driving unit or assembly (e.g., a wheel) such that the robot 10a travels along the determined travel route and travel plan.

The map data may include object identification information about various objects arranged in a space in which the robot 10a moves. For example, the map data may include object identification information about fixed objects such as walls and doors and movable objects such as pollen, chairs, and desks. The object identification information may include a name, a type, a distance, and a position.

The robot 10a may perform the operation or travel by controlling the driving unit based on a control/interaction of the user. The robot 10a may acquire intention information of the interaction due to the user's operation or speech utterance, determine a response based on the acquired intention information, and perform the operation.

Figure 5:
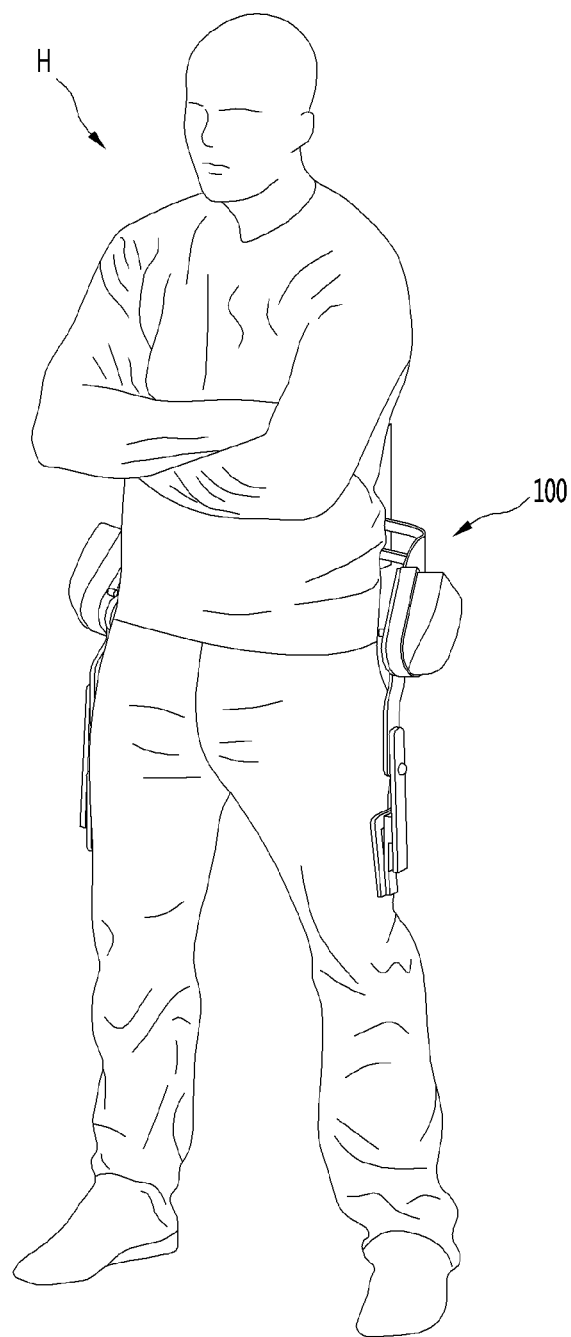
FIG. 5 illustrates the robot of FIG. 4 worn by a user.

Referring to FIGS. 4-5, an AI Apparatus 100 may be implemented as a robot (e.g., the robot 10a of FIG. 3). For convenience of description, the AI Apparatus 100 will be referred to as a robot 100. The robot 100 may be a wearable robot or exoskeleton as an example, but embodiments disclosed herein are not limited thereto.

The robot 100 may include a main body 101, a connecting frame 102, a series elastic actuator (SEA) or a SEA 110, a movable portion or frame 103 (a limb, arm, leg, etc.), and a mounting portion or frame 104.

The main body 101 may be configured to be worn behind a wearer's or user's body H, such as behind a back or pelvis of the body H. The main body 101 may include a housing that houses a battery, electrical components or circuitry (a printed circuit board, wiring, etc.), and a controller to control an operation of the robot 100 therein.

The connecting frame 102 may connect the main body 101 and the SEA 110. There may be a pair of connecting frames 102 connected to first and second sides (i.e., left and right sides) of the main body 101 and connected to a pair of SEAs 110.

The connecting frame 102 may bend or curve forward along an outer contour or circumference of the wearer's body H. For example, the connecting frame 102 may have a U-shape or inclined |_|-shape. An end of the connecting frame 102 coupled to the side of the main body 101 may face toward a side (i.e., a left or right side), and an end of the connecting frame 102 coupled to the SEA 110 may face toward a front.

There may be one SEA 110 at both sides of the wearer's body H (e.g., at or around each hip joint of the body H). The SEA 110 may be hingedly connected to the connecting frame 102 so that the user may freely spread and close his legs (i.e., abduction and adduction) while wearing the robot 100.

The movable frame 103 may be rotatably connected to the SEA 110. The movable frame 103 may extend to be long downward and forward in a direction toward a lower body (i.e., along a leg). The moveable frame 103 may be connected to the SEA 110 via a connecting portion or joint 103a provided at an upper end of the movable frame 103. The movable frame 103 may rotate about the joint 103a.

The moveable frame 103 may be optionally comprised of an upper frame or section and a lower frame or section that are moveably connected. The upper frame may rotate about the joint 103a, which may correspond to a hip joint. The lower frame may be slideably coupled to the upper frame so as to provide an adjustable length, or alternatively, the lower frame may be rotatably coupled to the upper frame so as to allow a more customized fit on the user's thigh. As another alternative, the upper frame of the moveable frame 103 may have a length corresponding to a user's thigh, the lower frame of the moveable frame 103 may have a length corresponding to a user's calf, and the lower frame may be rotatably coupled to the upper frame via a joint, which may correspond to a knee joint.

The mounting frame 104 may be connected to the lower end (i.e., the lower frame) of the movable frame 103. The mounting frame 104 may be configured to be secured to the user's leg (e.g., a lower thigh). A configuration or method to secure the mounting frame 104 to the wearer's leg is not limited. For example, inner sides of the mounting frame 104 may include an elastic or deformable cushion to keep the moveable frame 103 on the leg, or the mounting frame 104 may include an optional belt or strap that wraps around the leg.

The SEA 110 may provide a driving force to rotate the moveable frame 103 with respect to the SEA 110. When the SEA 110 rotates the movable frame 103 upward, the mounting frame 104 may apply an upward force to the user's leg to assist the user in raising their legs or in standing. When the SEA 110 rotates the movable frame 103 downward, the mounting frame 104 may apply a downward force to the user's leg to assist the user in lowering the leg or in sitting. The SEA 110 may rotate the moveable frame 103 in various combinations of upward or downward to assist the user in bending, lifting, walking, or other movement.

Figure 6:
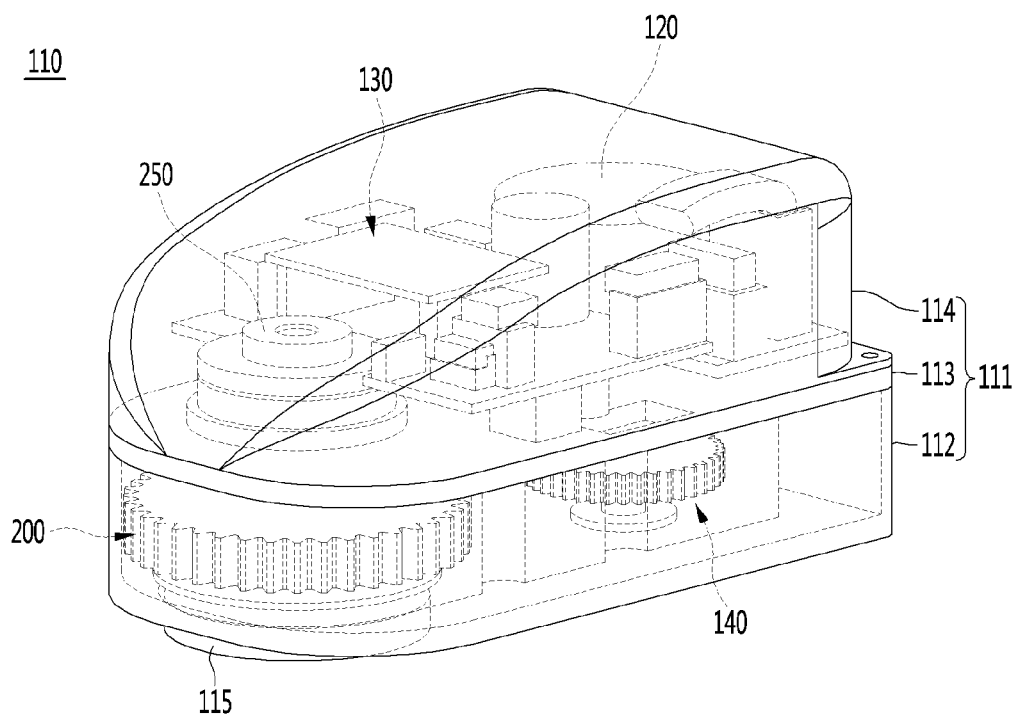
FIG. 6 illustrates an example of a series elastic actuator according to an embodiment.
Figure 7:
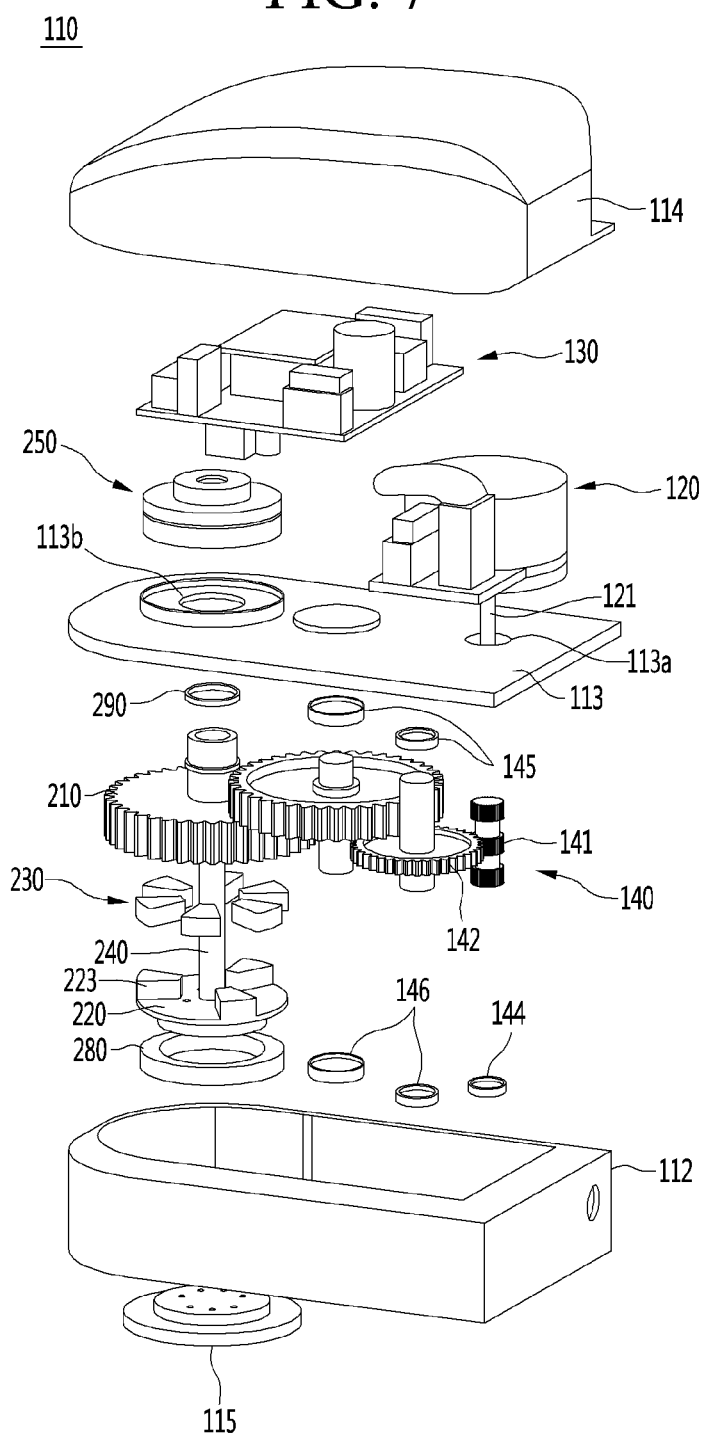
FIG. 7 is an exploded view of the series elastic actuator of FIG. 6.

Referring to FIGS. 6-7, the SEA 110 may include a housing 111, a rotational power source 120, a power transmission portion or transmitter 140, and an elastic gear module or assembly 200. The housing 111 may form an outer appearance or surface of the SEA 110. The housing 111 may include a first case 112 and a second case 114.

The first case 112 and the second case 114 may each define openings that face each other. A partition plate 113 may be provided between the openings of the first case 112 and the second case 114 to partition an internal space of the housing 111 into a first housing space and a second housing space. The first housing space may be defined as space between the first case 112 and the partition plate 113, and the second housing space may be defined as space between the second case 114 and the partition plate 113.

The partition plate 113 may have a plate shape and may be fastened (e.g., screwed, adhered, bolted, or pressed-fitted) to at least one of the first case 112 or the second case 114. As the partition plate 113 may cover the openings of each of the first case 112 and the second case 114, the partition plate 113 may be referred to as a cover.

The elastic gear module 200 may include a gear 210, an output body 220, an elastic body 230, a shaft 240, and an angle sensor 250. The power transmitter 140, the gear 210, the output body 220, the shaft, and the elastic body 230 may be provided in the first space inside of the first case 112. The rotational power source 120, an electrical portion or assembly 130, and an angle sensor 250 may be provided in the second housing space inside of the second case 114.

The rotational power source 120 may be a motor and may be embedded in the housing 111 between the second case 114 and the partition plate 113. A rotation shaft 121 of the rotational power source 120 may be connected to the power transmitter 140 through the partition plate 113. A through-hole 114a may be formed in the partition plate 113, and the rotation shaft 121 of the rotational power source 120 may pass through the through-hole 114a to couple to the power transmitter 140.

The rotational power source 120 may be electrically connected to the electrical assembly 130. The electrical assembly 130 may include at least one processor that controls the rotational power source 120. The electrical assembly 130 may be provided in the housing 111 between the second case 114 and the partition plate 113 so as to be easily connected to the rotational power source 120.

The power transmitter 140 may transmit the rotational force of the rotational power source 120 to the gear 210 of the elastic gear module 200. The power transmitter 140 may be provided in the housing 111 between the first case 112 and the partition plate 113 to be at a side of the housing 111 opposite to the rotational power source 120 with respect to the partition plate 113.

The power transmitter 140 may include a driving or prime gear 141 connected to the rotation shaft 121 of the rotational power source 120. The driving gear 141 may be a spur gear.

The driving gear 141 may be supported by a bearing 144 in a radial direction of the driving gear 141. At least one of the partition plate 113 or the first case 112 may include a bearing mounting portion or recess on which the bearing 144 is mounted. A first or upper side of the driving gear 141 may be connected to the rotation shaft 121, and a second or lower side of the driving gear 141 may be connected to the first case 112 by the bearing 144.

The power transmitter 140 may further include at least one intermediate gear 142 that transmits the rotational force from the driving gear 141 to the gear 210 of the elastic gear module 200. The intermediate gear 142 may be a spur gear. However, embodiments disclosed herein are not limited to having an intermediate gear 142, and alternatively, the intermediate gear 142 may be omitted, and the prime gear 141 may be directly engaged with the gear 210 of the elastic gear module 200.

The intermediate gear 142 may be supported by bearings 145 and 146 in a radial direction of the intermediate gear 142. At least one of the partition plate 113 or the first case 112 may be provided with a bearing mounting portion or recess on which the bearings 145 and 146 are mounted. A first or upper side of the intermediate gear 142 may be connected to the partition plate 113 via a cover side or upper bearing 145, and a second or lower side of the intermediate gear 142 may be connected to the first case 112 by a case side or lower bearing 146.

The elastic gear module 200 may receive the rotational force of the rotational power source 120 through the power transmitter 140, and the elastic gear module 200 may transmit the rotational force to an external load (e.g., the movable frame 103 of the robot 100 shown in FIG. 4). A portion of the elastic gear module 200 may be provided between the first case 112 and the partition plate 113, and another portion of the elastic gear module 200 may be located between the second case 114 and the partition plate 113. While the gear 210, the output body 220, the elastic body 230, and the shaft 240 may be provided in the first housing space between the first case 112 and the partition plate 113, the angle sensor 250 may be provided in the second housing space between the second case 114 and the partition plate 113.

The gear 210 of the elastic gear module 200 may alternatively be referred to as an output gear or driven gear. The gear 210 may be a spur gear engaged with intermediate gear 142 and provided between the first case 112 and the partition plate 113 to be provided on a same side of the partition plate 113 as the power transmitter 140. The power transmitter 140 and the gear 210 may be easily connected.

The gear 210 may be supported by a bearing 290 in a radial direction of the gear 210. The partition plate 113 may be provided with a bearing mounting portion or recess on which the bearing 290 is mounted, and the gear 210 may be connected to the partition plate 113 by the bearing 290. The bearing 290 may include an inner ring that rotates together with the gear 210, an outer ring fixed to a surface of the partition plate 113, and a rolling member (e.g., a ball or a roller) located between the inner ring and the outer ring.

The output body 220 may have a disc or circulate plate shape and may be rotated by the gear 210. The output body 220 may be connected to an external load (i.e., the movable frame 103 of the robot 100 shown in FIG. 4) via an output bracket or coupler 115. The output bracket 115 may have a disc or circular plate shape. The output bracket 115 may be provided outside of the housing 111 and may be fastened to the external load. As an example, the output bracket 115 may be fixed to the joint 103a (FIG. 4) of the movable frame 103 of the robot 100, but embodiments disclosed herein are not limited.

An opening may be formed in a bottom of the first case 112, and the output bracket 115 and the output body 220 may be fastened to each other through the opening. The output body 220 may be supported by a bearing 280 in a radial direction of the output body 220. The first case 112 may have a bearing mounting portion or recess on which the bearing 280 is mounted. The bearing 280 may include an inner ring rotating together with the output body 220, an outer ring fixed to an inner surface of the first case 112, and a rolling member (e.g., a ball or a roller) located between the inner ring and the outer ring.

The elastic body 230 may be provided between the gear 210 and the output body 220 to connect the gear 210 and the output body 220. The elastic body 230 may be fixed to the gear 210 and the output body 220, and the elastic body 230 may transmit the rotational force of the gear 210 to the output body 220.

The elastic body 230 may be configured to be elastically deformed in a circumferential direction of the elastic body 230 to allow the output body 220 to flexibly respond to the external load.

The shaft 240 may be integrally formed with the output body 220, or alternatively, the shaft 240 and the output body 220 may be formed separately and later coupled. The shaft 240 may extend from the output body 220 toward the elastic body 230 and the gear 210. The shaft 240 may pass through the elastic body 230 and the gear 210. The shaft 240 may extend along a rotation axis of the gear 210 and the output body 220, and the gear 210 and the output body 220 may rotate about the shaft 240.

The angle sensor 250 may be coupled to the shaft 240 and provided at a side of the gear 210 opposite to a side coupled to the output body 220. The angle sensor 250 may measure how much the shaft 240 has rotated. Data from the angle sensor 250 may be used to calculate a difference in movement between the gear 210 and the output body 220, and a deformation of the elastic body 230 may be determined so that an output force of the output body 220 may be calculated. The output force may be precisely controlled based on data from the angle sensor 250.

The angle sensor 250 may be provided in the second housing space between the second case 114 and the partition plate 113 to be on the same side as the electrical assembly 130 with respect to the partition plate 113. The angle sensor 250 may be easily connected to the electrical assembly 130.

The shaft 240 may penetrate an opening 114b formed in the partition plate 113 to connect to the angle sensor 250. The electrical assembly 130 may be electrically connected to the angle sensor 250 and include at least one processor for feedback control of the rotational power source 120 based on sensing data transmitted from the angle sensor 250.

Figure 8:
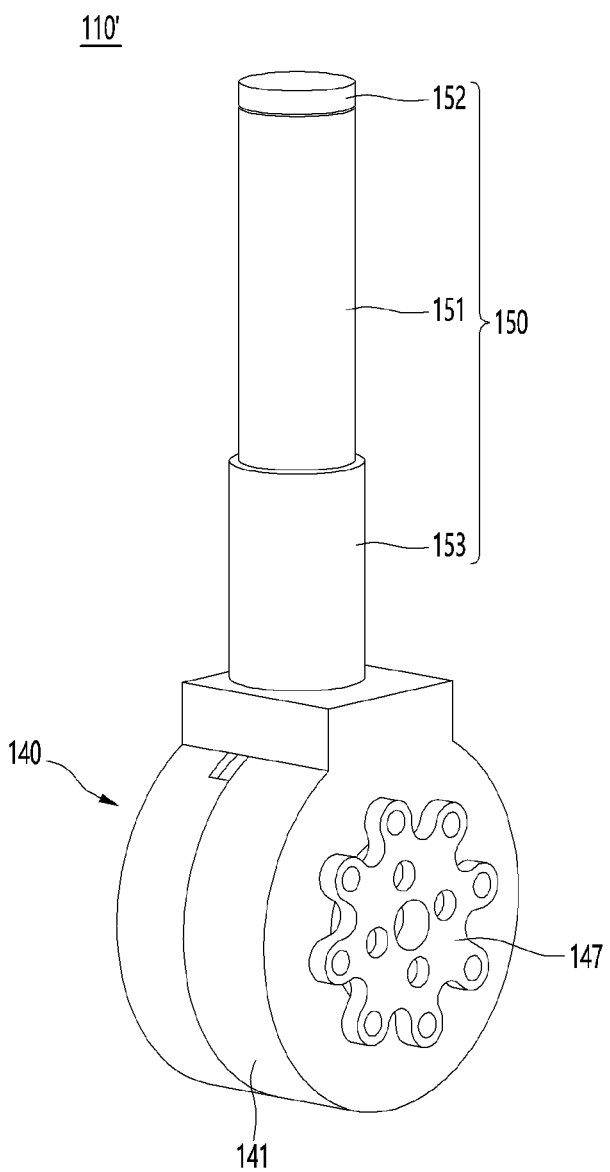
FIG. 8 illustrates another example of a series elastic actuator according to an embodiment.
Figure 9:
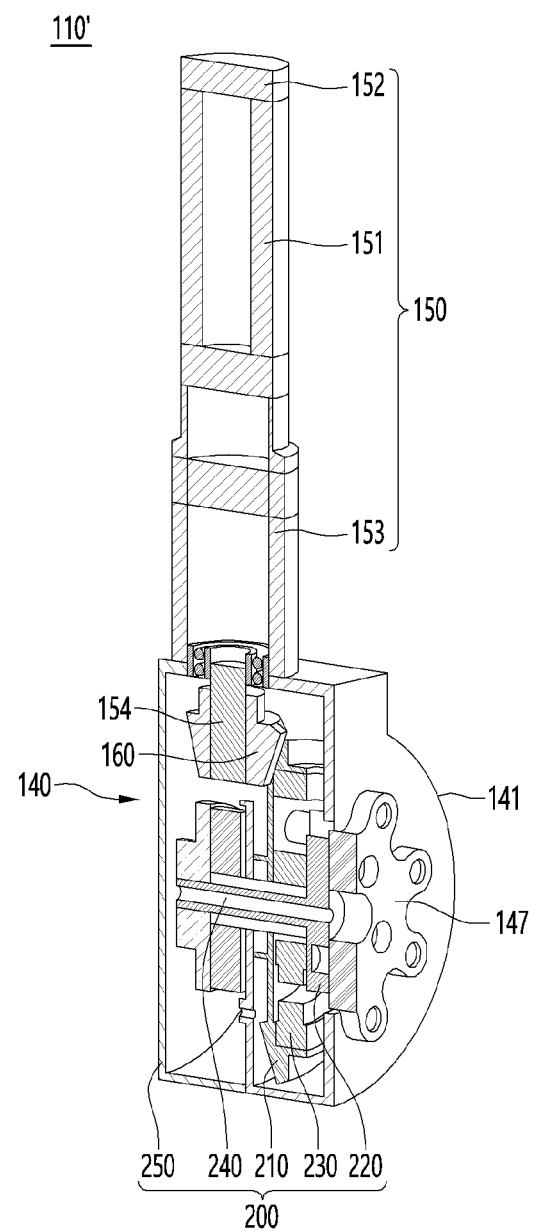
FIG. 9 is a cu perspective view of the series elastic actuator of FIG. 8.
Figure 10:
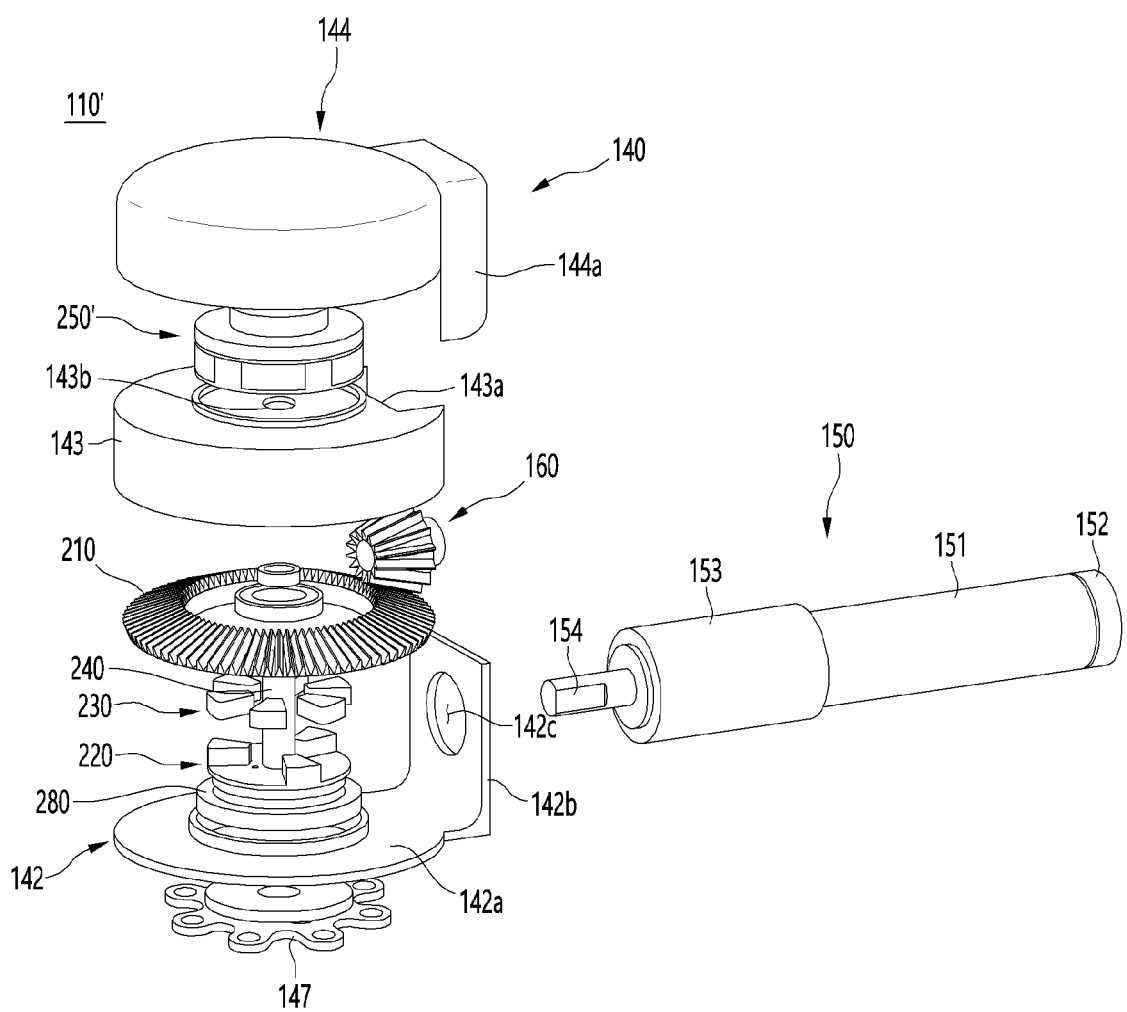
FIG. 10 is an exploded view illustrating the series elastic actuator of FIG. 8.
Figure 11:
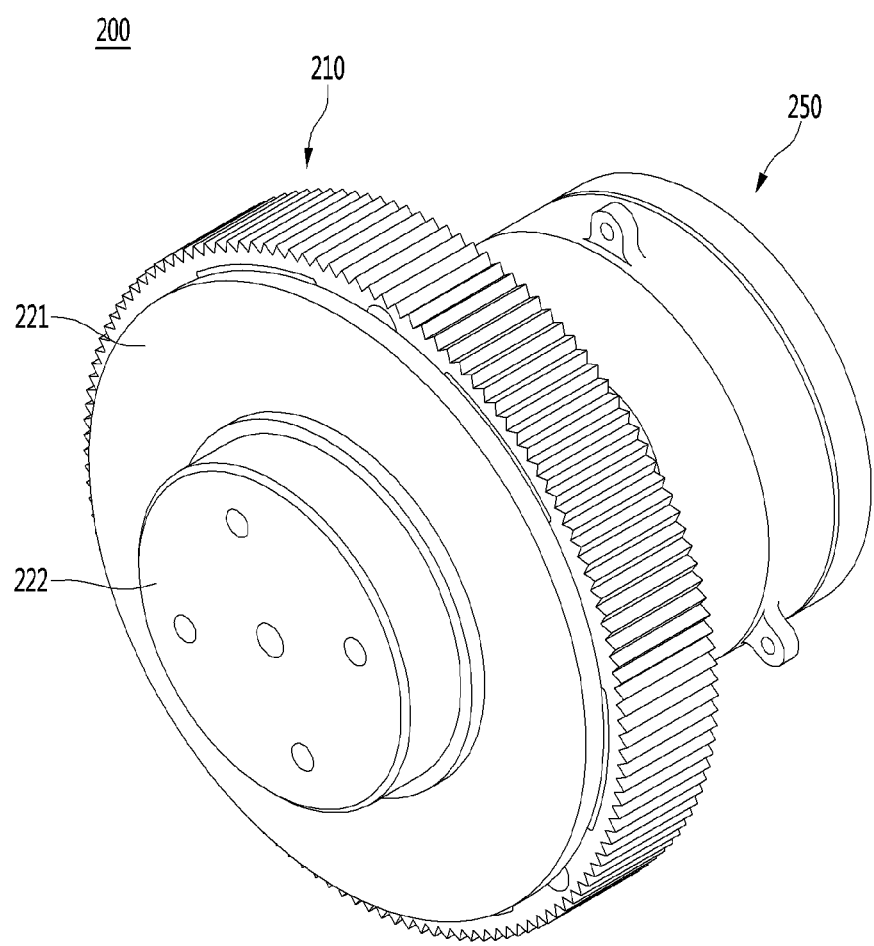
FIG. 11 is a perspective view illustrating an elastic gear module according to an embodiment.
Figure 12:
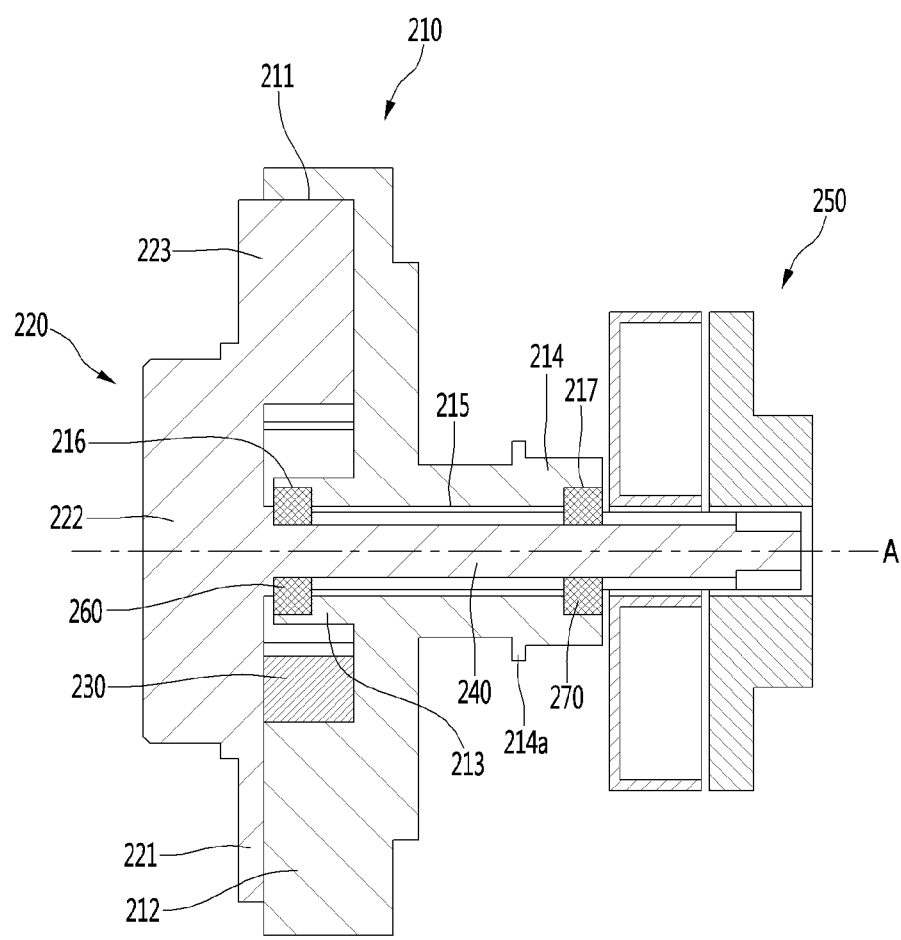
FIG. 12 is a cross-sectional view illustrating the elastic gear module according to an embodiment.
Figure 13:
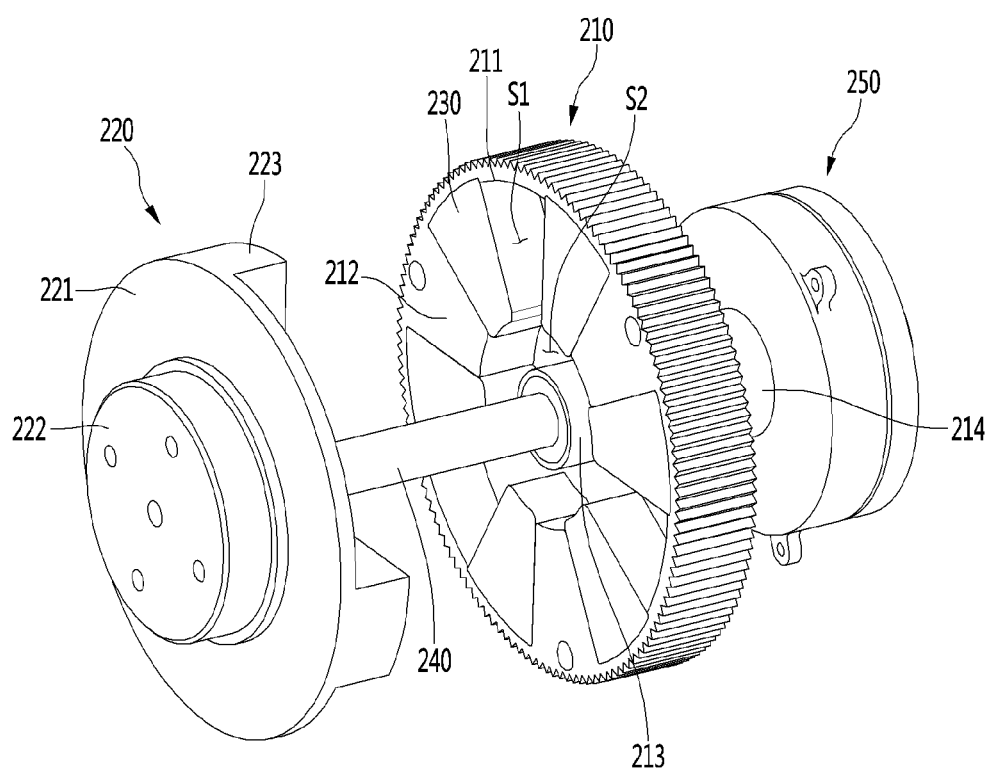
FIG. 13 illustrates an output body separated from a gear according to an embodiment.
Figure 14:
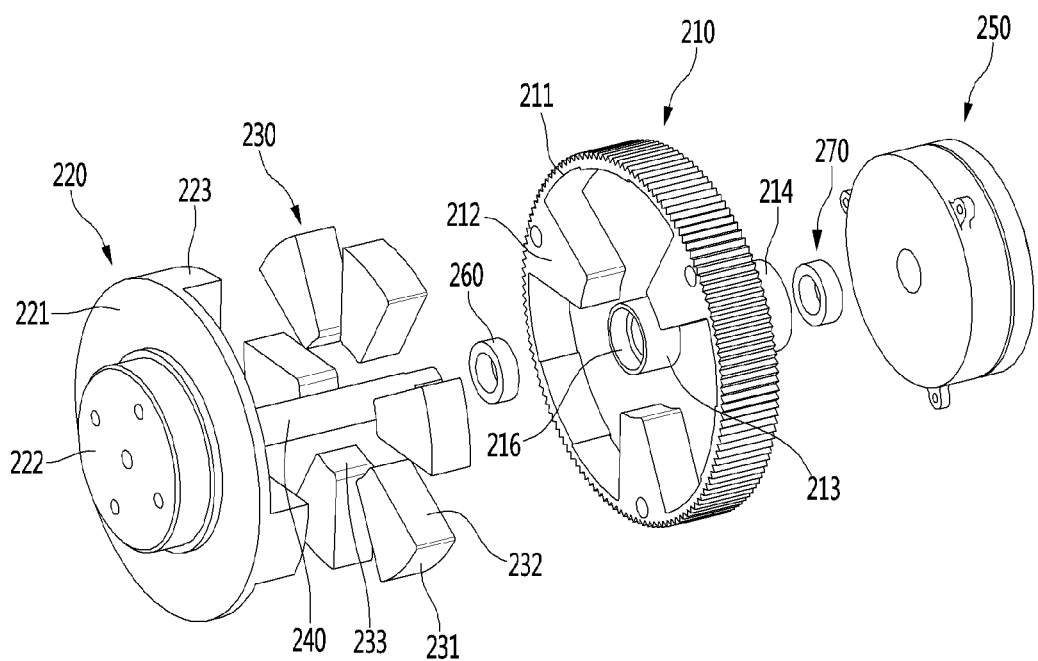
FIG. 14 is an exploded view illustrating an elastic gear module according to an embodiment.
Figure 15:
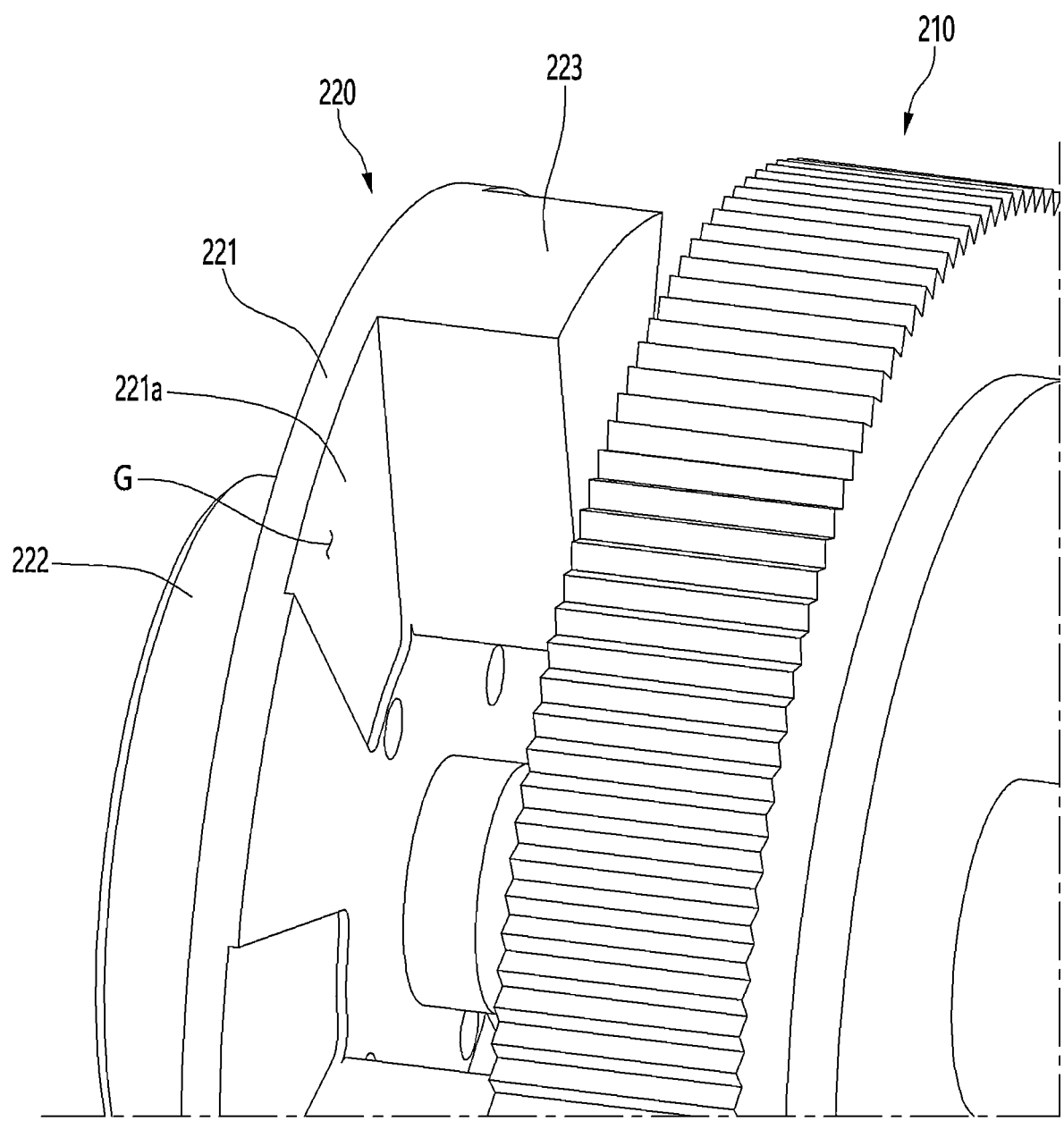
FIG. 15 illustrates a stepped portion of the output body according to an embodiment.

Referring to FIGS. 8-10, an SEA 110' according to another example will be described. The SEA 110' may include a rotational power source 150 and an output module 140.

The rotational power source 150 may be a geared motor and may have an approximate shape that extends to be long in one direction. The rotational power source 150 may include a motor main body 151, an encoder 152 that senses rotation of the motor main body 151, and a gear head 153. The gear head 153 may include a plurality of gears to decelerate a rotation transmitted from the motor main body 151 and to transmit the rotation to a rotation shaft 154 protruding from the gear head 153. Since the configuration of a geared motor is a well-known technique, a detailed description thereof will be omitted.

The output module 140 may include a housing 141, a or prime driving gear 160, and an elastic gear module 200. The housing 141 may form an outer appearance of the output module 140 and have an approximate cylindrical shape. The housing 141 may include a first surface, the second surface opposite to the first surface, and a circumferential surface connecting the first surface and the second surface. The rotational power source 150 may be connected to the circumferential surface of the housing 141.

The housing 141 may include a cover 142, a first case 143, and a second case 144. The first case 143 and the second case 144 may be sequentially stacked on the cover 142. An inner space of the housing 141 may be partitioned into a first housing space between the cover 142 and the first case 143 and a second housing space between the first case 143 and the second case 144.

A gear 210, an output body 220, and an elastic body 230 may be provided between the cover 142 and the first case 143 in the first housing space. An angle sensor 250 may be provided between the first case 143 and the second case 144 in the second housing space.

The cover 142 may include a cover panel 142a and a connection panel 142b connected to the cover panel 142a. The cover panel 142a may have an approximate disc or ring shape. The cover panel 142a may form the first surface of the housing 141.

The connection panel 142b may be connected to the edge of the cover panel 142a and extend perpendicular to the cover panel 142a. The connection panel 142b may be provided with a connecting hole 142c through which the rotational power source 150 is inserted.

The first case 143 may have a cylindrical chamber shape in which a first surface (e.g., a bottom surface) is opened. The opened first surface of the first case 143 may be covered by the panel cover 142a of the cover 142. The first case 143 may form a portion of the circumferential surface of the housing 141. A second surface (e.g., an upper surface) of the first case 143 may be unopened and referred to as a partition plate partitioning the first housing space and the second housing space.

A cutout 143a may be formed at a position corresponding to the connection panel 142b of the cover 142 in the first case 143. The cutout 143a may be formed by cutting a portion of a circumferential surface of the first case 143 and a portion of the second unopened surface of the first case 143. The driving gear 160 may be provided within the cutout 143a so as not to interfere with the first case 143.

The second case 144 may have a cylindrical chamber shape having one opened surface (e.g., a bottom surface of the second case 144 may be opened). The opened surface of the second case 144 may be covered by the first case 143. The second case 144 may form a portion of the circumferential surface and the second surface of the housing 141.

The second case 144 may be provided with a connecting portion or panel 144a surrounding an edge of the connection panel 142b of the cover 142. The connecting portion 144a may be provided around a portion of the second case 144. The connecting portion 144a may be connected to and be in contact with the edge of the cover panel 142a of the cover 142.

The connection portion 144a may form space with the cover panel 142a in which the driving gear 160 is received. The driving gear 160 may be a bevel gear, and may transmit a rotational force of the rotational power source 150 to the gear 210 of the elastic gear module 200. The driving gear 160 may be provided within the housing 141 in a space defined by the connecting portion 144a of the second case 144 and the cover panel 142a of the cover 142.

The driving gear 160 may be connected to the rotation shaft 154 of the rotational power source 150. The rotation shaft 154 may penetrate the connecting hole 142c defined in the cover 142 to couple to the driving gear 160.

The elastic gear module 200 may be similar to the elastic gear module 200 described with reference to FIGS. 6-7, and a similar description may be omitted while differences are primarily described. The elastic gear module 200 may be provided in the housing 141. A portion of the elastic gear module 200 may be located between the cover 142 and the first case 143, while another portion of the elastic gear module 200 may be located between the first case 143 and the second case 144.

The elastic gear module 200 may include a gear 210, an output body 220, an elastic body 230, and a shaft 240. The elastic gear module 200 may further include an angle sensor 250.

The gear 210 may be a bevel gear engaged with the driving gear 160. The gear 210 may alternatively be referred to as an output gear or driven gear. The gear 210 may be provided between the cover 142 and the first case 143. The output body 220 may be rotated by the gear 210 and connected to an external load (e.g., movable frame 103 in FIG. 4) through an output bracket 147. The output bracket 147 may be provided outside the housing 141 and may be fastened to the external load. For example, the output bracket 147 may be connected to the joint 103a of the movable frame 103 of the robot 100 of FIG. 4.

An opening may be defined in the cover panel 142a, and the output bracket 147 and the output body 220 may be fastened to each other through the opening. The output body 220 may be supported by the bearing 280 in the radial direction. The cover panel 142a may be formed with a bearing mounting portion or recess in which a bearing 280 is provided. The output body 220 may be connected to the cover 142 via the bearing 280.

The elastic body 230 may be provided between the gear 210 and the output body 220 to connect the gear 210 and the output body 220. The elastic body 230 may be coupled to the gear 210 and the output body 220 to transmit the rotational force of the gear 210 to the output body 220.

The elastic body 230 may be elastically deformed in a circumferential direction. The output body 220 may flexibly respond to an external load by the elastic body 230.

The shaft 240 may be coupled to the output body 220. The shaft 240 may be formed integrally with the output body 220, or alternatively, the shaft 240 and the output body 220 may be formed separately and later combined. The shaft 240 may extend from the output body 220 toward the elastic body 230 and the gear 210 in the axial direction. The shaft 240 may penetrate the elastic body 230 and the gear 210. The shaft 240 may extend along a rotation axis of the gear 210 and the output body 220, and the gear 210 and the output body 220 may rotate about the shaft 240.

The angle sensor 250 may be provided at a side of the gear 210 opposite to a side of the gear 210 facing the output body 220. The angle sensor 250 may be connected to shaft 240. The angle sensor 250' may detect an angle at which the shaft 240' rotates or an orientation of the shaft 240.

The angle sensor 250' may be provided between the first case 143 and the second case 144. The shaft 240 may penetrate the first case 143 via the opening 143b to be connected to the angle sensor 250.

Hereinafter, the elastic gear module 200 will be described in more detail. The elastic gear module 200 may be used for either series elastic actuator 110 or 110'. In addition, the elastic gear module 200 may be replaced with elastic gear modules described in U.S. application Ser. No. 16/877,687 filed on May 19, 2020 and now issued as U.S. Pat. No. 11,346,434) and U.S. application Ser. No. 16/877,723 filed on May 19, 2020 and now issued as U.S. Pat. No. 11,835, 411).

Referring to FIGS. 11-15, a plurality of elastic bodies 230 may be spaced apart from each other in the circumferential direction. Each elastic body 230 may have a block shape. The elastic body 230 may have an arc or angled block shape in which a circumferential length of the elastic body 230 may be increased in the radial direction toward an outer edge or side of the elastic body 230.

The elastic body 230 may be made of an elastic nonmetal material (e.g., a synthetic resin material or a urethane material) The urethane included in the elastic body 230 may have an elastic modulus according to a shape and a Shore hardness. An appropriate or corresponding shape and urethane material may be determined according to an elastic modulus required or predetermined for the elastic body 230. For example, when the diameter of the gear 210 is 55 mm or less and the elastic modulus of the elastic body 230 is to be adjusted to 300 Nm/rad to 1000 Nm/rad, the Shore hardness of the urethane included in the elastic body 230 may be A70.

The elastic body 230 may be mounted on a first surface of the gear 210. The mounting recess 211 on which the elastic body 230 is mounted may be formed on the first surface of the gear 210. When the elastic body 230 is mounted in the mounting recess 211, the elastic body 230 may not protrude from the first surface of the gear 210 with respect to the axial direction of the gear 210. An axial height of the elastic body 230 may be equal to or less than a depression depth of the mounting recess 211, and an assembly of the gear 210 and the elastic body 230 may be compact.

A supporting or fitting portion 212 protruding in a radially inward direction may be defined at an inner circumference of the mounting recess 211. A plurality of supporting portions 212 may be spaced apart from each other in the circumferential direction. The supporting portion 212 may support the elastic body 230 in the circumferential direction.

The supporting portion 212 may be positioned between a pair of elastic bodies 230 adjacent to each other. A pair of elastic bodies 230 spaced apart from each other in a circumferential direction may be provided between a pair of supporting portions 212 adjacent to each other. An insertion or a first space S1 into which an insertion portion or wedge 223 of the output body 220 is inserted may be defined between the pair of elastic bodies 230. Each elastic body 230 may be located between the insertion portion 223 and the supporting portion 212 in the circumferential direction.

The gear 210 may be formed with a hollow portion or inner protrusion 213 through which the shaft 240 passes. The protrusion 213 may have a hollow cylinder shape. The rotation axis A of the gear 210 may pass through the protrusion 213. The protrusion 213 may be formed to protrude from the mounting recess 211 in an axial direction.

An outer circumference of the inner protrusion 213 may be spaced apart from the supporting portion 212 in the radial direction. An outer circumference of the inner protrusion 213 may be spaced apart from the elastic body 230 in the radial direction. A free or second space S2 may be defined between the elastic body 230 and the inner protrusion 213 to radially surround the inner protrusion 213. The free space S2 may be configured in consideration of a volume in which the elastic body 230 is deformed. The elastic body 230 may be elastically deformed smoothly by the free space S2 so as not to interfere with the inner protrusion 213.

The elastic body 230 may include an outer surface or side 231 facing the inner circumference of the mounting recess 211, a pair of side surfaces or sides 232 connected to opposite ends of the outer surface 231 and defined to be long in a radial direction, and an inner surface or side 233 connecting the inner end portions of the pair of side surfaces 232. The outer surface 231 may be in contact with the inner circumference of the mounting recess 211 of the gear 210. The outer surface 231 may have a same curvature or center of curvature as the inner circumference of the mounting recess 211. The outer surface 231 may be referred to as an outer circumference.

The side surface 232 may be defined to be long in the radial direction, and the elastic modulus of the elastic body 230 in the circumferential direction may be kept relatively constant. One of the pair of side surfaces 232 may be in contact with the insertion portion 223 defined in the output body 220, and the other thereof may be in contact with the supporting portion 212 of the gear 210. The insertion space S1 may be defined between the side surface 232 of one elastic body 230 and the side surface 232 of the other elastic body 230.

The inner surface 233 may face the inner protrusion 213 of the gear 210. The inner surface 233 may be spaced apart from the outer circumference of the inner protrusion 213 in the radial direction. The free space S2 may be defined between the inner surface 233 and the outer circumference of the inner protrusion 213.

The inner surface 233 may be concave to have a same center of curvature as the outer surface 231. The inner surface 233 may be referred to as an inner circumference.

The gear 210 may be formed with a protruding portion or protrusion 214 which may be hollow. The protrusion 214 may protrude in an axial direction from a side of the gear 210 opposite to a side that is coupled to the elastic body 230. The protrusion 214 may be formed at a center, and a rotation axis A of the gear 210 may pass through the protrusion 214. The protrusion 214 may protrude toward the angle sensor 250 such that an end of the protrusion 214 contacts or is provided adjacent to the angle sensor 250. The protrusion 214 and the inner protrusion 213 may alternatively be referred to as first and second protrusions.

Ribs 214a may be defined on an outer circumferential surface of the protrusion 214. A bearing 290 (FIG. 7) may be mounted on the outer circumferential surface of the protrusion 214, and the rib 214a may support the bearing 290 in the axial direction of the gear 210. At least a portion of the protrusion 214 may form a bearing mounting portion with the rib 214a.

The output body 220 may cover a first surface or side of the gear 210 and the plurality of elastic bodies 230. The output body 220 may include a large-diameter portion or outer portion 221 and a small-diameter portion or inner protrusion 222. The inner protrusion 222 may protrude in the axial direction from the outer portion 221.

The outer portion 221 may substantially have a disc shape and may be in contact with or adjacent to the elastic body 230. The outer portion 221 may also be referred to as a rotating plate.

The inner protrusion 222 may protrude from a first surface of the outer portion 221. The bearing 280 (FIG. 7) may be mounted on the outer circumference of the inner protrusion 222. The output bracket 115 (FIG. 7) may be fastened to the inner protrusion 222.

The insertion portion 223 may protrude from the outer portion 221 of the output body 220, and may be integrally defined with the outer portion 221. The insertion portion 223 may be inserted between a pair of elastic bodies 230 adjacent to each other to be inserted into the insertion space S1. When the gear 210 is rotated, the elastic body 230 may be elastically deformed, and the insertion portion 223 may be pushed in the circumferential direction to transmit the rotational force to the output body 220.

The insertion portion 223 may have a shape corresponding to the insertion space S1. The insertion portion 223 may have an arc or wedge block shape in which a circumferential length of the inserting portion 223 increases in a radial direction toward an outer edge or rim. The insertion portion 223 may be spaced apart from the outer circumference of the inner protrusion 213 in the radial direction.

The elastic body 230 may be compressed between the insertion portion 223 and the supporting portion 212 and biased between the insertion portion 223 and the supporting portion 212. When the insertion portion 223 is inserted into the insertion space S1, preload may occur in the elastic body 230.

A circumferential angle of the insertion portion 223 may be larger than a circumferential angle of the insertion space S1 without the insertion portion 223 being inserted. A circumferential angle between the pair of elastic bodies 230 when the insertion portion 223 is not inserted between the pair of elastic bodies 230 may be smaller than the circumferential angle of the insertion portion 223. The elastic body 230 may transmit the rotational force of the gear 210 to the output body 220 without mechanical backlash.

The shaft 240 may be located on the rotation axis A of the gear 210 and the output body 220. The gear 210 and the output body 220 may rotate about the shaft 240.

The shaft 240 may be connected to the outer portion 221 of the output body 220. The shaft 240 may extend in a direction perpendicular to the outer portion 221 at a center of the outer portion 221 (i.e., the axial direction). The shaft 240 may pass through the elastic body 230 and the gear 210.

The gear 210 may be formed with a through-portion or hole 215 through which the shaft 240 passes. The through-portion 215 may penetrate the inner protrusion 213 and the protrusion 214 such that an inside of the inner protrusion 213 and an inside of the protrusion 214 may form the through-portion 215.

The shaft 240 may be connected to the angle sensor 250 by sequentially passing through the inner protrusion 213 and the protrusion 214 (i.e., through the through-portion 215) of the gear 210.

The elastic gear module 200 may further include bearings 260 and 270 rotatably supporting the shaft 240. The elastic body 230 may be mounted on the mounting recess 211 formed in the gear 210. A rigidity of the gear 210 and the elastic body 230 with respect to an external force may be weakened as compared with a case where there is no mounting recess 211. The bearings 260 and 270 may reinforce the gear 210 with respect to the external force and may support smooth rotation of the shaft 240.

The bearings 260 and 270 may be radial bearings that contact an outer circumference of the shaft 240 to support the shaft 240 in the radial direction. The bearing 290 (FIG. 7) mounted on the outer circumference of the protrusion 214 of the gear 210 or the bearing 280 mounted on the outer circumference of the inner protrusion 222 of the output body 220 (FIG. 7) may each be referred to as an outer bearing. The bearings 260 and 270 supporting the shaft 240 may be referred to as inner bearings. A type of the bearings 260 and 270 is not limited. In one example, the bearings 260 and 270 may be ball bearings or roller bearings.

The gear 210 may be formed with bearing mounting recesses 216 and 217 on which bearings 260 and 270 are mounted. The bearing mounting recesses 216 and 217 may be formed on inner circumferences of the inner protrusion 213 and protrusion 214 to communicate with the through-portion 215. The bearing mounting recesses 216 and 217 may be formed at end portions of the through-portion 215 such that a first bearing mounting recess 216 in which a first bearing 260 may be provided may be formed inside of the inner protrusion 214 and a second bearing mounting recess 217 in which a second bearing 270 may be provided may be formed inside of the protrusion 214.

In first bearing 260 and the second bearing 270 may be spaced apart from each other in the axial direction. The first bearing 260 may be adjacent to the output body 220, and the second bearing 270 may be adjacent to the angle sensor 250.

The first bearing 260 may be mounted on the first bearing mounting recess 216 and the second bearing 270 may be mounted on the second bearing mounting recess 217. The first bearing mounting recess 216 may be defined in the inner circumference of the inner protrusion 213 at an end portion of the inner protrusion 213. The second bearing mounting recess 217 may be formed in the inner circumference of the protrusion 214 at an end portion of the protrusion 214.

The output body 220 may have a stepped portion 221a facing the elastic body 230 in a direction parallel to the axial direction. The stepped portion 221a may be stepped on a surface of both surfaces of the outer portion 221 facing the gear 210.

The size and shape of the stepped portion 221a may correspond to the elastic body 230. The stepped portion 221a may have an arc shape in which a circumferential length becomes longer in the radial direction toward an outer edge or rim thereof. Like the elastic body 230, a plurality of stepped portions 221a may be spaced apart from each other in the circumferential direction.

The output body 220 may be axially adjacent or in contact with one surface of the gear 210 and the supporting portion 212. The output body 220 may be spaced apart from the elastic body 230 in the axial direction by the stepped portion 221a, and a gap (G) may be defined between the stepped portion 221a and the elastic body 230. The elastic body 230' may be elastically deformed smoothly within the gap.

Figure 16:
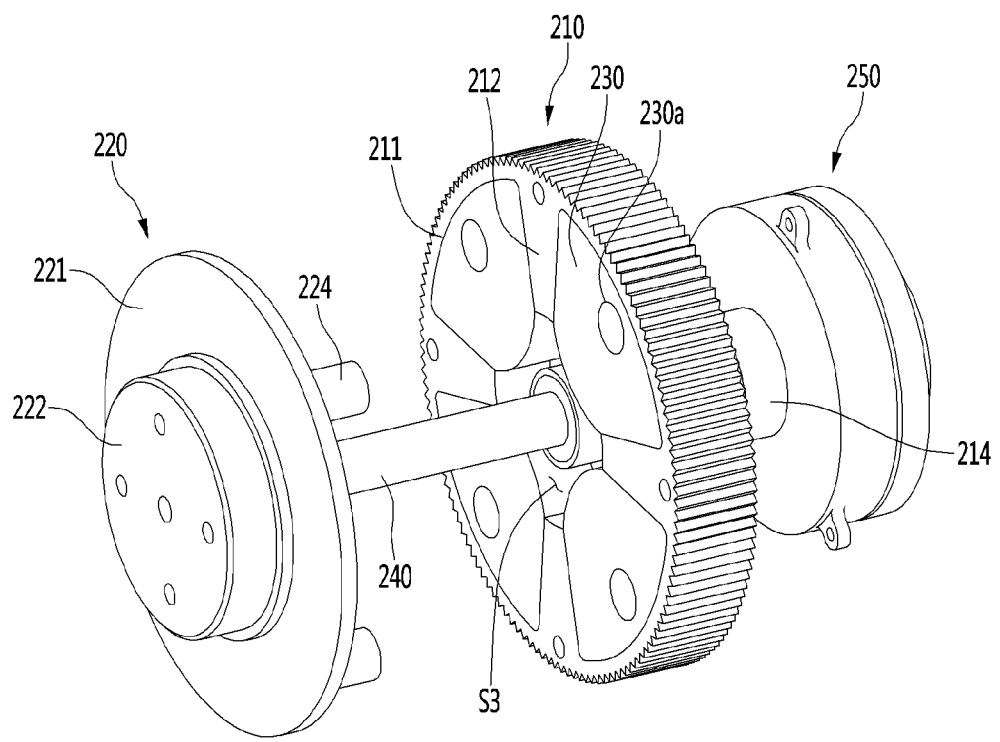
FIG. 16 is a view illustrating a state where an output body is separated from a gear according to another embodiment of the elastic gear module.
Figure 17:
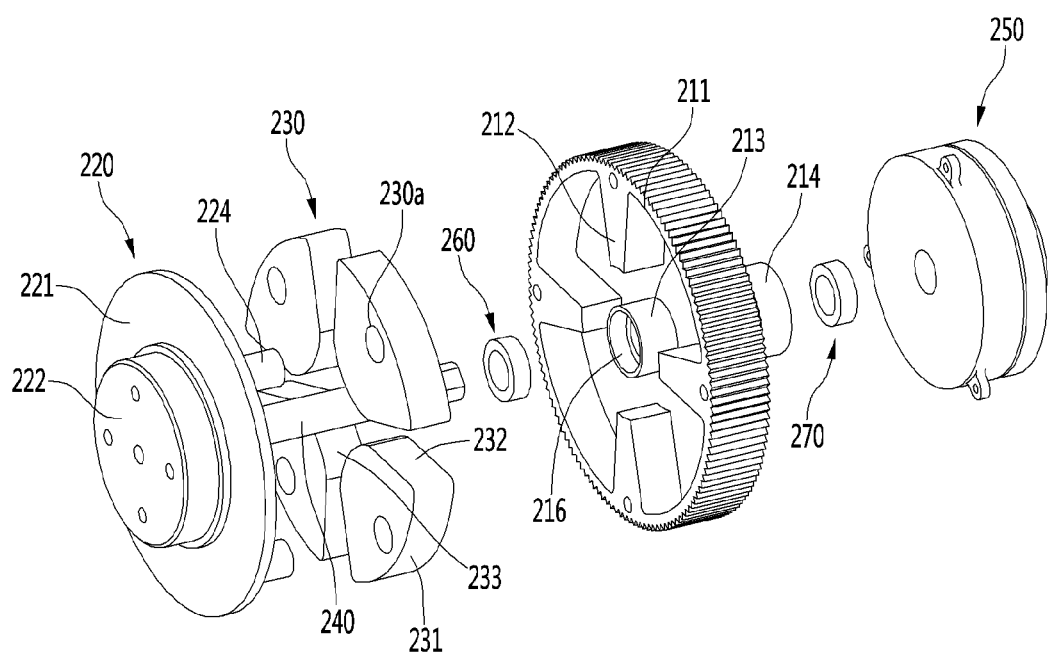
FIG. 17 is an exploded view illustrating the elastic gear module of FIG. 16.

Referring to FIGS. 16-17, the elastic body 230 may have a slightly wider or larger shape than the elastic body 230 described with reference to FIGS. 11-15 and may have a through hole 230a. The following description may omit overlapping descriptions and mainly focus on differences from the elastic gear module 200 described with reference to FIGS. 11-15.

The elastic body 230 may be provided between a pair of supporting portions 212 adjacent to each other. A side surface 232 of the elastic body 230 may be in contact with one supporting portion 212, and the other side surface 232 thereof may be in contact with another supporting portion 212.

The elastic body 230 may be compressed between a pair of supporting portions 212. The elastic body 230 may be in a compression biased state between the pair of supporting portions 212. When the elastic body 230 is inserted between the pair of supporting portions 212, a preload may occur in the elastic body 230.

A circumferential angle between the pair of supporting portions 212 may be smaller than a circumferential angle of the elastic body 230 when the elastic body is not inserted between the pair of supporting portions 212. The elastic body 230 may transmit a rotational force of the gear 210 to the output body 220 without mechanical backlash. An inner surface or side 233 of the elastic body 230 may be convexly formed or curved toward the inner protrusion 213 of the gear 210.

An insertion portion or bar 224 may be formed to protrude from the outer portion of the output body 220 toward the elastic body 230 so as to extend in a direction parallel to the axial direction. The through-hole 230a may penetrate the elastic body 230 in a direction parallel to the axial direction, and the insertion portion 224 may be inserted into the through-hole 230a. The insertion portion 224 may have a shape corresponding to an inner contour of the through-hole 230a (e.g., a cylindrical bar or circular bar shape when the through-hole 230a is round). A plurality of insertion portions 224 may be spaced apart in the circumferential direction.

The outer diameter of the insertion portion 224 may be slightly larger than an inner diameter of the through-hole 230a. The insertion portion 224 inserted into the through-hole 230a may press the elastic body 230 in a radially outward direction to generate a preload on the elastic body 230. The elastic body 230 may transmit the rotational force of the gear 210 to the output body 220 without mechanical backlash.

This application is related to co-pending U.S. application Ser. No. 16/877,687; and now issued as U.S. Pat. No. 11,346,434) filed on May 19, 2020 and Ser. No. 16/877,723 filed on May 19, 2020, the entire contents of which are incorporated by reference herein.

Embodiments disclosed herein may provide a gear provided with a mounting recess or portion to receive a plurality of elastic bodies and an output body having an insertion portion to be inserted between the plurality of elastic bodies, or inserted into a through-hole formed in an elastic body. The gear, elastic bodies, and output body may be part of a series elastic actuator that may be compact compared to series elastic actuators using a conventional spring method.

A rigidity of the elastic body may be easily changed by adjusting a shape and a number of the elastic body. The elastic body may be easily designed to have a required or predetermined rigidity while keeping a size of the elastic body compact.

The elastic body may be made of synthetic resin material such as urethane. As a result, a shape of the elastic body is simplified, and an elastic modulus of the elastic body can be easily designed. The elastic body may be mounted in a mounting recess defined in the gear. Thereby, a combination of the gear and the elastic body can be made compact.

The output body and the elastic body may be spaced apart in the axial direction by a stepped portion formed in the output body. As a result, a free space capable of deforming a shape of the elastic body may be formed, and the elastic body may be elastically deformed smoothly.

The elastic body may have an arc or wedge block shape in which a circumferential length thereof becomes longer toward an outside of the radius. Thereby, the elastic modulus of the elastic body in the rotational direction can be maintained relatively constant.

When the insertion portion of the output body is inserted between the plurality of elastic bodies, the elastic body may be compressed between the supporting portion of the gear and the insertion portion of the output body. The elastic body can transmit the rotational force of the gear to the output body without mechanical backlash.

When the insertion portion of the output body is inserted into the through-hole formed in the elastic body, a diameter of the insertion portion may be larger than a diameter of the through-hole. As a result, the insertion portion inserted into the through-hole may press the elastic body, and the elastic body may transmit the rotational force of the gear to the output body without mechanical backlash.

The above description is merely illustrative of the technical idea of the present disclosure, and those skilled in the art to which the present disclosure pertains may make various modifications and changes without departing from the essential characteristics of the present disclosure.

Embodiments disclosed herein are not intended to limit the technical idea of the present disclosure but are to describe the present disclosure, and the scope of the technical idea of the present disclosure is not limited thereto by these embodiments.

The scope of protection of the present disclosure should be interpreted by the following claims, and all technical ideas within the scope equivalent thereto should be construed as being included in the scope of the present disclosure.

Embodiments disclosed herein may provide a compact series elastic actuator. Embodiments disclosed herein may provide a series elastic actuator that is compact and easy to design the necessary rigidity.

Embodiments disclosed herein may be implemented as a series elastic actuator including a gear configured to rotate by a rotational power source or motor, a mounting recess defined on a surface of the gear, a plurality of elastic bodies received in the mounting recess, including non-metal elastic material, and spaced apart from each other in a circumferential direction, an output body arranged to cover the surface of the gear, and at least one insertion portion configured to protrude from the output body to be inserted between a pair of elastic bodies of the plurality of elastic bodies, which may be adjacent to each other.

A plurality of supporting portions may protrude in a radially inward direction and support the elastic body in the circumferential direction. The plurality of supporting portions may be defined on an inner circumference of the mounting recess. The elastic body may be compressed between the insertion portion and the supporting portion in the circumferential direction. A stepped portion facing the elastic body in an axial direction may be defined on the output body.

Embodiments disclosed herein may be implemented as a series elastic actuator including a gear configured to rotate by a rotational power source or a motor, a mounting recess defined on one surface of the gear, a plurality of elastic bodies being received in the mounting recess, including non-metal elastic material, and being spaced apart from each other in a circumferential direction, a through-hole defined in the elastic body, an output body arranged to cover one surface of the gear, and a plurality of insertion portions protruding from the output body to be inserted into the through-hole.

A diameter of the insertion portion may be larger than a diameter of the through-hole. A plurality of supporting portions protruding in a radially inward direction and supporting the elastic body in the circumferential direction may be defined on an inner circumference of the mounting recess. The elastic body may be compressed between a pair of supporting portions adjacent to each other in the circumferential direction.

The elastic body may be made of synthetic resin material. The elastic body may be made of urethane material. The elastic body may have an arc or wedge shape in which a circumferential length becomes longer toward the outside of the radius thereof.

The series elastic actuator may further include a shaft connected to the output body and penetrating the gear. The series elastic actuator may further include an angle sensor being connected to the shaft and positioned opposite the output body with respect to the gear.

A hollow portion or protrusion through which the shaft passes may be defined in the mounting recess. An outer circumference of the hollow portion may be spaced apart from the elastic body in the radial direction. A bearing mounting recess on which a bearing supporting the shaft in a radial direction is mounted may be defined on an inner circumference of the hollow portion.

Embodiments disclosed herein may be implemented as an elastic actuator comprising a gear configured to transmit a rotational force, a mounting recess defined on a first side of the gear, a plurality of elastic wedges configured to be received in the mounting recess at positions spaced apart from each other in a circumferential direction of the mounting recess, each elastic wedge including a non-metal elastic material, an output body configured to cover the first side of the gear, and at least one insertion wedge protruding from a first side of the output body toward the first side of the gear and configured to be inserted between a pair of adjacent elastic wedges among the plurality of elastic wedges.

An inner circumferential surface of the gear may be defined by the mounting recess, and a plurality of supports may protrude radially inward from the inner circumferential surface to support the elastic wedges in the circumferential direction. The at least one insertion wedge may include a plurality of insertion wedges, and each elastic wedge may be compressed in the circumferential direction between one insertion wedge and one support.

The first side of the output body may be formed with a plurality of stepped portions that are recessed away from the gear and are arranged to align with the plurality of elastic wedges such that stepped portions form gaps between the elastic wedges and the output body.

Embodiments disclosed herein may be implemented as an elastic actuator comprising a gear configured to transmit a rotational force, a mounting recess formed in a first side of the gear, a plurality of elastic wedges configured to be received in the mounting recess at positions that are spaced apart from each other in a circumferential direction of the mounting recess, each elastic wedge including a non-metal elastic material, a through-hole penetrating an elastic wedge among the plurality of elastic wedges, an output body configured to cover the first side of the gear, and at least one insertion bar protruding from a first side of the output body toward the first side of the gear and configured to be inserted into the through-hole. A diameter of the insertion bar may be larger than a diameter of the through-hole.

An inner circumference of the gear may be defined by the mounting recess, and a plurality of supports may protrude radially inward from the inner circumference to support the elastic wedges in the circumferential direction. Each elastic wedge may be compressed between a pair of adjacent supports.

The elastic wedge may be made of synthetic resin material. The elastic wedge may be made of urethane material. The elastic wedge may have a wedge shape in which a circumferential length increases in a radial direction of the mounting recess from an inner side toward an outer edge.

A shaft may be coupled to the output body and penetrating the gear. An angle sensor may be coupled to the shaft and positioned at a second side of the gear that is opposite to the first side of the gear. A protrusion having an inner space through which the shaft passes may be formed to extend from the mounting recess toward the output body. An outer circumferential surface of the protrusion may be spaced apart from the elastic wedge in the radial direction. A bearing may support the shaft in a radial direction of the shaft. The protrusion may include an inner circumferential surface that defines the inner space. A bearing mounting recess may be formed in the inner circumferential surface to receive the bearing.

At least two elastic wedges may be formed with the through-hole. The at least one insertion bar may include at least two insertion bars configured to be inserted into the through-holes of the at least two elastic wedges, respectively.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An elastic actuator comprising:
   a gear configured to transmit a rotational force;
   a mounting recess defined on a first side of the gear;
   a plurality of elastic wedges configured to be received in the mounting recess at positions spaced apart from each other in a circumferential direction of the mounting recess, each elastic wedge including a non-metal elastic material;
   an output body configured to cover the first side of the gear; and
   at least one insertion wedge protruding from a first side of the output body toward the first side of the gear and configured to be inserted between a pair of adjacent elastic wedges among the plurality of elastic wedges,
   wherein the first side of the output body is formed with a plurality of stepped portions that are recessed away from the gear and are arranged to align with the plurality of elastic wedges such that stepped portions form gaps between the elastic wedges and the output body.

2. The elastic actuator of claim 1, wherein an inner circumferential surface of the gear is defined by the mounting recess, and a plurality of supports protrude radially inward from the inner circumferential surface to support the elastic wedges in the circumferential direction.

3. The elastic actuator of claim 2, wherein the at least one insertion wedge include a plurality of insertion wedges, and each elastic wedge is compressed in the circumferential direction between one insertion wedge and one support.

4. The elastic actuator of claim 1, wherein the elastic wedge has a wedge shape in which a circumferential length increases in a radial direction of the mounting recess from an inner side toward an outer edge.

5. The elastic actuator of claim 1, further comprising a shaft coupled to the output body and penetrating the gear.

6. The elastic actuator of claim 5, wherein a protrusion having an inner space through which the shaft passes is formed to extend from the mounting recess toward the output body.

7. The elastic actuator of claim 6, wherein an outer circumferential surface of the protrusion is spaced apart from the elastic wedge in the radial direction.

8. The elastic actuator of claim 1, further comprising an angle sensor coupled to the shaft and positioned at a second side of the gear that is opposite to the first side of the gear.

9. An elastic actuator comprising:
   a gear configured to transmit a rotational force;
   a mounting recess defined on a first side of the gear;
   a plurality of elastic wedges configured to be received in the mounting recess at positions spaced apart from each other in a circumferential direction of the mounting recess, each elastic wedge including a non-metal elastic material;
   an output body configured to cover the first side of the gear;
   at least one insertion wedge protruding from a first side of the output body toward the first side of the year and configured to be inserted between a pair of adjacent elastic wedges among the plurality of elastic wedges; and
   a shaft coupled to the output body and penetrating the gear,
   wherein a protrusion having an inner space through which the shaft passes is formed to extend from the mounting recess toward the output body,
   wherein the elastic actuator further comprises comprising a bearing to support the shaft in a radial direction of the shaft, and wherein the protrusion includes an inner circumferential surface that defines the inner space, and a bearing mounting recess is formed in the inner circumferential surface to receive the bearing.

10. A robot comprising:
a main body;
a connecting frame connected the main body; and
an elastic actuator connected to the connecting frame and configured to be worn on an user's body, the elastic actuator comprising:
a gear configured to transmit a rotational force;
a mounting recess defined on a first side of the gear;
a plurality of elastic wedges configured to be received in the mounting recess at positions spaced apart from each other in a circumferential direction of the mounting recess, each elastic wedge including a non-metal elastic material;
an output body configured to cover the first side of the gear; and
at least one insertion wedge protruding from a first side of the output body toward the first side of the gear and configured to be inserted between a pair of adjacent elastic wedges among the plurality of elastic wedges,
wherein the first side of the output body is formed with a plurality of stepped portions that are recessed away from the gear and are arranged to align with the plurality of elastic wedges such that stepped portions form gaps between the elastic wedges and the output body.

11. The robot of claim 10, wherein an inner circumferential surface of the gear is defined by the mounting recess, and a plurality of supports protrude radially inward from the inner circumferential surface to support the elastic wedges in the circumferential direction.

12. The robot of claim 11, wherein the at least one insertion wedge include a plurality of insertion wedges, and each elastic wedge is compressed in the circumferential direction between one insertion wedge and one support.

13. The robot of claim 10, further comprising a shaft coupled to the output body and penetrating the gear.

14. The robot of claim 13, wherein a protrusion having an inner space through which the shaft passes is formed to extend from the mounting recess toward the output body.

15. The elastic actuator of claim 14, wherein an outer circumferential surface of the protrusion is spaced apart from the elastic wedge in the radial direction.

16. The robot of claim 14, further comprising a bearing to support the shaft in a radial direction of the shaft,
wherein the protrusion includes an inner circumferential surface that defines the inner space and a bearing mounting recess is formed in the inner circumferential surface to receive the bearing.

17. The robot of claim 10, further comprising an angle sensor coupled to the shaft and positioned at a second side of the gear that is opposite to the first side of the gear.

* * * * *